Patented Nov. 14, 1922.

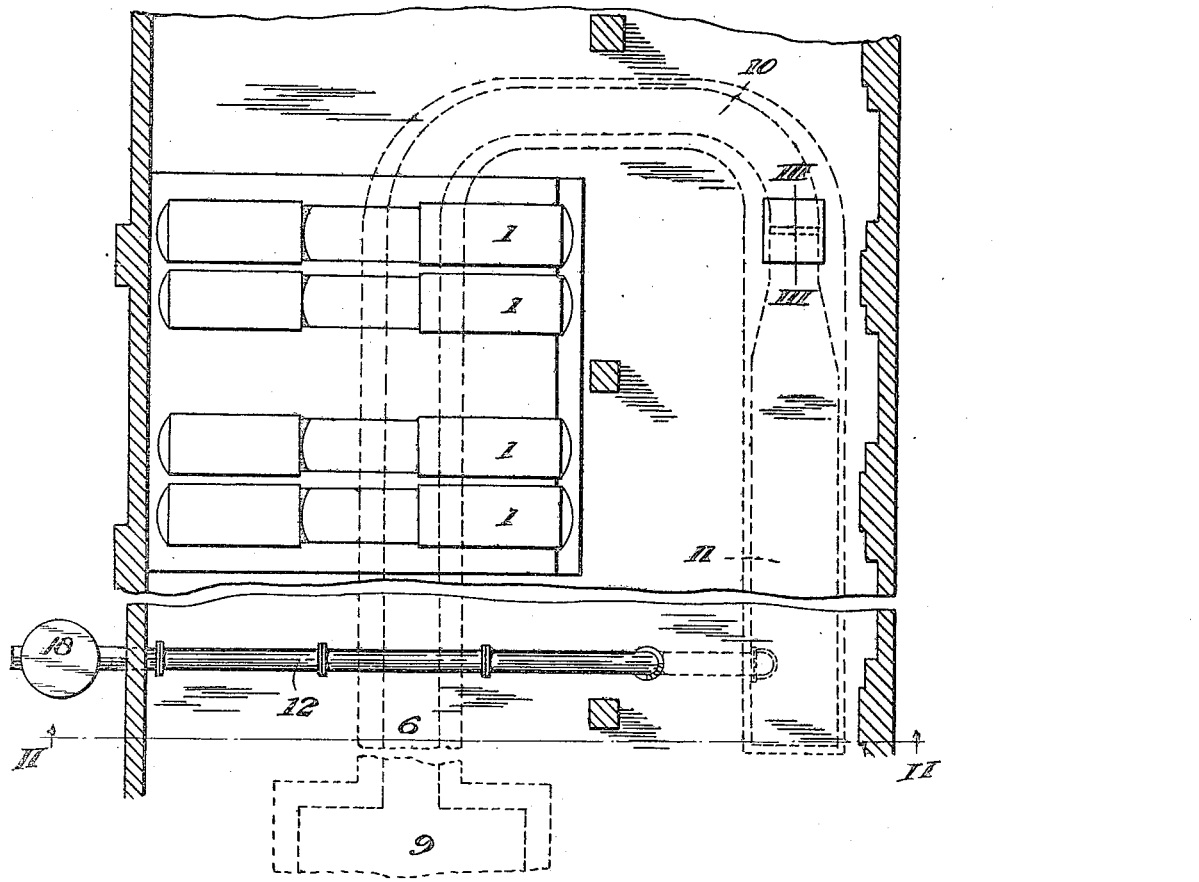

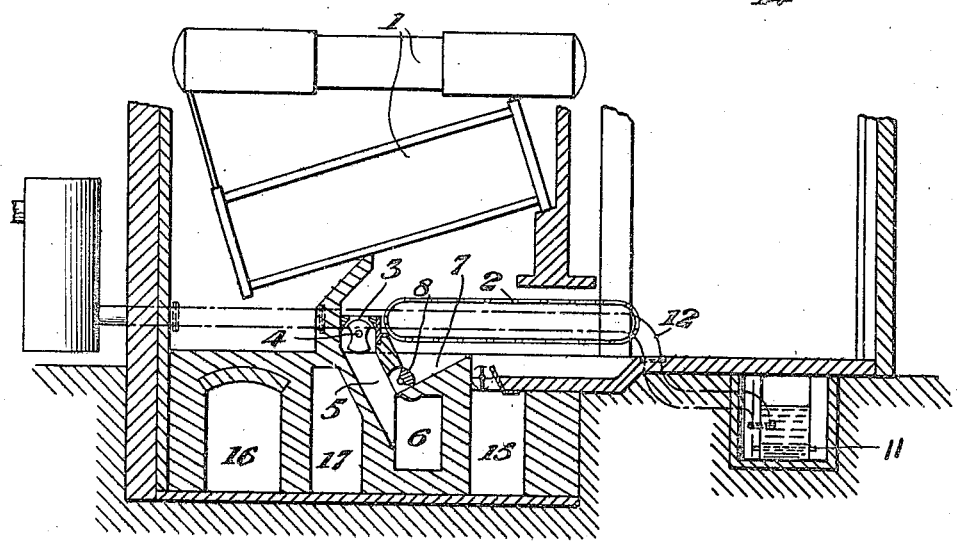

1,435,621

UNITED STATES PATENT OFFICE.

ROBERT W. L. PHILLIPS AND JOHN R. BLAIKIE, OF BEDFORD, ENGLAND.

FURNACE.

Application filed May 24, 1921. Serial No. 472,251.

(GRANTED UNDER THE PROVISIONS OF THE ACT OF MARCH 3, 1921, 41 STAT. L., 1313.)

*To all whom it may concern:*

Be it known that we, ROBERT WILFRED LUCAS PHILLIPS and JOHN RUTHERFORD BLAIKIE, both subjects of the King of Great Britain, both residing in Bedford, England, have jointly invented certain new and useful Improvements in or Relating to Furnaces (for which we have filed applications in England Nov. 21, 1919, Patent No. 159298; in France Dec. 4, 1920, Serial No. 137065, and in Germany Nov. 23, 1920, Serial No. 40986), of which the following is a specification.

This invention is for improvements in or relating to the hydraulic removal of ashes and the like from furnaces, and has for its object to provide a simple construction whereby the ashes from the furnace grate shall be quickly and efficiently intermittently transferred to an ash pit or sump.

It is not broadly new to remove ashes from a substantially horizontal trough or duct, into which they are discharged from one or more furnace grates, by means of a stream of water, but the present invention is characterized by intermittently operative means provided at or near one end of the duct to flush the latter with suddenly released bodies of water so as to sweep the ashes out through the other end of the duct. Conveniently there is a reservoir communicating with one end of the ash duct and an automatic swing weir interposed in the connection between the reservoir and the duct, whereby during successive intervals of time water is first gradually stored up in the former and is thereafter automatically discharged therefrom into the duct by the automatic opening of the swing weir to clear the duct at each flush.

The invention therefore provides a method of removing ashes and the like from a duct arranged to receive the same from one or more furnace grates, consisting in intermittently flushing the duct with suddenly released bodies of water.

A feature of the invention consists in supplying the reservoir with water from a condenser plant. Another feature of the invention is the use of a trough or duct having a flat-bottomed cross section as this facilitates the sweeping of the clinker by the wave of water, as compared with troughs of curved bottom cross section.

The invention will be more clearly understood from the following description of one preferred embodiment thereof given by way of example with the aid of the accompanying drawings, in which Fig. 1 is a plan of the furnace system with the upper masonry structure above the furnace removed; Fig. 2 is a section on the line II—II of Fig. 1; and Fig. 3 is a section on the line III—III of Fig. 1.

Like reference numerals indicate like parts throughout the drawings.

A plurality of boilers, indicated generally by the reference numeral 1, is constructed with a separate furnace grate for each boiler. The boilers and furnaces are arranged side by side and each furnace is shown as having a travelling or mechanical grate indicated at 2.

At the back end of each grate is a swinging support 3, on to which ashes are discharged from the grate during its movement and all such supports may be mounted conveniently on a single oscillating shaft 4 for operation when required. The purpose of the supports 3 is that when sufficient ashes and clinker have been discharged on to them, they may be swung by means of the shaft 4 to tip the ashes into chutes 5 conveniently arranged one for each grate, and also to prevent leakage of air or flue gases from the back of the grate.

Each chute 5 is in open communication with a substantially horizontal duct 6 having a flat-bottomed cross section built into the furnace structure, and extending in a direction transverse to the length of the furnace grates and under all of them. Beneath each grate is a space 7 for the reception of such fine ash as will fall through the interstices in the travelling grate, such ash passing from the bottom of the space 7 into the chute 5 when desired by the opening of a closure device 8, which normally operates to prevent leakage of air or flue gases.

At one of its ends the duct 6 is carried out through the furnace structure and discharges into an ash pit or sump, diagrammatically indicated at 9. At its other end the duct communicates by means of a channel 10 with a reservoir 11 arranged parallel with it and supplied with waste water from a condenser plant 18 through a pipe 12.

Interposed in the connection between the reservoir and the ash duct is a swing weir 13 of known form comprising a flap or member arranged to swing about a horizontal trunnion or pivot 14 and so balanced as normally to assume an approximately vertical position, shown in full lines in Fig. 3, to close the oulet end of the waterway. In other words, it closes communication between the reservoir 11 and the ash duct 6. A considerable quantity of water from the condenser plant 18 gradually becomes stored within the reservoir 11 behind the weir, and when the water has reached a certain level above the line of the pivot 14, its pressure is sufficient to overbalance and swing the weir into the position shown in dotted lines in Fig. 3, thus opening communication between the reservoir and the ash duct. The momentum of the water, which immediately commences to flow into the duct 6, is sufficient to retain the swing weir 13 in the open position until substantially all the stored water has been discharged into the duct 6. Thereafter the weir automatically closes by its own balance into the full line position in Fig. 3 to close again communication between the reservoir and the ash duct.

It will be seen that the suddenly released and comparatively large mass of water passing from the reservoir 11 into the duct 6 sweeps the light material of the ashes with it through the discharge end of the duct into the ash sump, the heavy material being moved along the duct a few feet at a time with each flush. This flushing operation is repeated automatically and periodically as the water collects again behind the weir and automatically discharges in the manner described above.

The water and ash are discharged together into the sump 9, and from or near the bottom of the latter the water can escape, passing in doing so through the ash or clinker which acts as a filter for the water to ensure a clear effluent. The ash and clinker can be removed in any desired manner.

The furnaces will be provided with an air duct such as 15, flues and inspection tunnel, diagrammatically shown at 16 and 17, and other structures normally provided or required for the particular type of furnace to which the invention is applied.

It will be obvious that although the invention has been described in detail as applied to one particular form of furnace, it may be adapted to various other forms without departing from the spirit of the invention. For example, there is no need that the grates should be travelling grates, as the ashes may be raked or rabbled either on to a swinging support or directly into an ash duct in front of the boiler. Moreover, it is not essential that the ash duct 6 be below the level of the furnace grate or in fact that it be part of the furnace structure. It could be arranged as a duct into which the ashes are mechanically or otherwise removed, either continuously or intermittently, but by its communication with the supply of water from a reservoir such as 10 the ashes will be cleared from this duct from time to time.

The water supply may be from any convenient source, not necessarily waste water from a condenser plant, and the means for supplying it to the ash duct may be manually or automatically controlled by means other than that hereinbefore described.

The term "ash" throughout the foregoing specification includes any ash, clinker or fuel which may from time to time be discharged from the grate.

Having thus described the nature of the said invention and the best means we know of carrying the same into practical effect, we claim:—

1. In a boiler installation the combination of a number of furnace grates with a substantially horizontal duct adapted to receive clinker discharged from each grate, a reservoir at one end of the said duct constituting a continuation thereof, means for constantly discharging water into the said reservoir and an automatic swing weir between the said reservoir and the duct and filling the cross section of the duct, whereby intermittently the large volume of water which has accumulated in the reservoir is permitted to flow along the duct.

2. In a boiler installation the combination of a number of furnace grates with a substantially horizontal duct adapted to receive clinker discharged from each grate, a reservoir at one end of the said duct constituting a continuation thereof, a condenser for the steam using installation, a discharge pipe through which the whole or part of the cooling water from the condenser flows continuously into the said reservoir and an automatic swing weir between the said reservoir and the duct and filling the cross section of the duct, whereby intermittently the large volume of water which has accumulated in the reservoir is permitted to flow along the duct.

3. In a boiler installation the combination of a number of furnace grates with a substantially horizontal duct having a flat-bottomed cross section adapted to receive clinker discharged from each grate, a reservoir at one end of the said duct constituting a continuation thereof, a condenser for the boiler installation, a discharge pipe through which cooling water from the condenser flows continuously into the said reservoir and an automatic swing weir between the said reservoir and the duct and filling the cross section of the duct, whereby intermittently the large volume of water which has accumulated in the reservoir is permitted to flow along the duct.

In testimony whereof we have signed our names to this specification.

R. W. L. PHILLIPS.
JOHN R. BLAIKIE.